(12) United States Patent
Cong et al.

(10) Patent No.: US 11,907,108 B2
(45) Date of Patent: Feb. 20, 2024

(54) GENERATING WORKLOADS FOR SYSTEM VERIFICATION

(71) Applicant: INTERNATIONAL BUSINESS MACHINES CORPORATION, Armonk, NY (US)

(72) Inventors: Xue Bin Cong, Beijing (CN); Xiao Feng Meng, Beijing (CN); Ping Liang, Shang Di (CN); Yu He, Beijing (CN); Peng Hui Jiang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

(21) Appl. No.: 17/568,966

(22) Filed: Jan. 5, 2022

(65) Prior Publication Data

US 2023/0214315 A1 Jul. 6, 2023

(51) Int. Cl.
G06F 11/00 (2006.01)
G06F 11/36 (2006.01)

(52) U.S. Cl.
CPC ...... G06F 11/3684 (2013.01); G06F 11/3688 (2013.01)

(58) Field of Classification Search
CPC .................. G06F 11/3684; G06F 11/3688
See application file for complete search history.

(56) References Cited

U.S. PATENT DOCUMENTS

| | | | |
|---|---|---|---|
| 8,732,126 B2 | 5/2014 | Dias et al. | |
| 8,996,915 B2 | 3/2015 | Clifford et al. | |
| 2007/0220371 A1* | 9/2007 | Duyanovich | G06F 11/3485 714/49 |
| 2011/0107307 A1* | 5/2011 | Liu | G06F 11/3664 717/130 |
| 2014/0280373 A1* | 9/2014 | Raitto | G06F 16/27 707/803 |
| 2018/0004633 A1 | 1/2018 | Conti et al. | |

(Continued)

FOREIGN PATENT DOCUMENTS

CN 110737594 A 1/2020

OTHER PUBLICATIONS

IBM, "z/Architecture—Principles of Operation," IBM Publication No. SA22-7832-12, Thirteenth Edition, Sep. 2019, pp. 1-2000.

(Continued)

*Primary Examiner* — Joshua P Lottich
(74) *Attorney, Agent, or Firm* — Stephanie Carusillo, Esq.; Blanche E. Schiller, Esq.; HESLIN ROTHENBERG FARLEY & MESITI P.C.

(57) ABSTRACT

A workload is generated to verify a system. The generating includes parsing one or more statements of an input test case to create one or more parsed structures. A comparison is performed of at least one parsed structure of the one or more parsed structures and at least one workload structure of at least one existing workload to identify one or more workload structures as matching the at least one parsed structure. Runtime data relating to at least the one or more workload structures identified as matching is obtained. The workload is created based on at least one matching workload structure of the one or more workload structures identified as matching, the at least one parsed structure of the one or more parsed structures and the runtime data.

15 Claims, 15 Drawing Sheets

(56) References Cited

U.S. PATENT DOCUMENTS

| | | |
|---|---|---|
| 2018/0004642 A1 | 1/2018 | Conti et al. |
| 2018/0067844 A1* | 3/2018 | Conti et al. |
| 2019/0079853 A1* | 3/2019 | Makkar ............... G06F 11/3684 |
| 2019/0163556 A1* | 5/2019 | Kataria ............... G06F 11/0748 |
| 2019/0324893 A1* | 10/2019 | Vaishnav ............ G06F 11/3664 |
| 2022/0075710 A1* | 3/2022 | Glowa ................ G06F 11/3684 |
| 2023/0205678 A1* | 6/2023 | Bollepally .......... G06F 11/3696 |
| | | 717/124 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

* cited by examiner

GENERATING WORKLOADS FOR SYSTEM VERIFICATION

BACKGROUND

One or more aspects relate, in general, to processing within a computing environment, and in particular, to facilitating such processing.

To improve processing within a system, such as a database system, extensive testing is performed. Typically, system testers manually add tests to system test workloads which are executed to test the system. These tests are derived from defects reported by users, new functions, improvements to existing functions, etc.

Enhancements in generating system test workloads are sought to enable system verification to be more effective, providing increased performance, availability and/or security of the system and computing environment.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes generating a workload to verify a system. The generating the workload includes parsing one or more statements of an input test case to create one or more parsed structures. A comparison is performed of at least one parsed structure of the one or more parsed structures and at least one workload structure of at least one existing workload to identify one or more workload structures as matching the at least one parsed structure. Runtime data relating to at least the one or more workload structures identified as matching is obtained. The workload is created based on at least one matching workload structure of the one or more workload structures identified as matching, the at least one parsed structure of the one or more parsed structures and the runtime data.

Computer-implemented methods and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
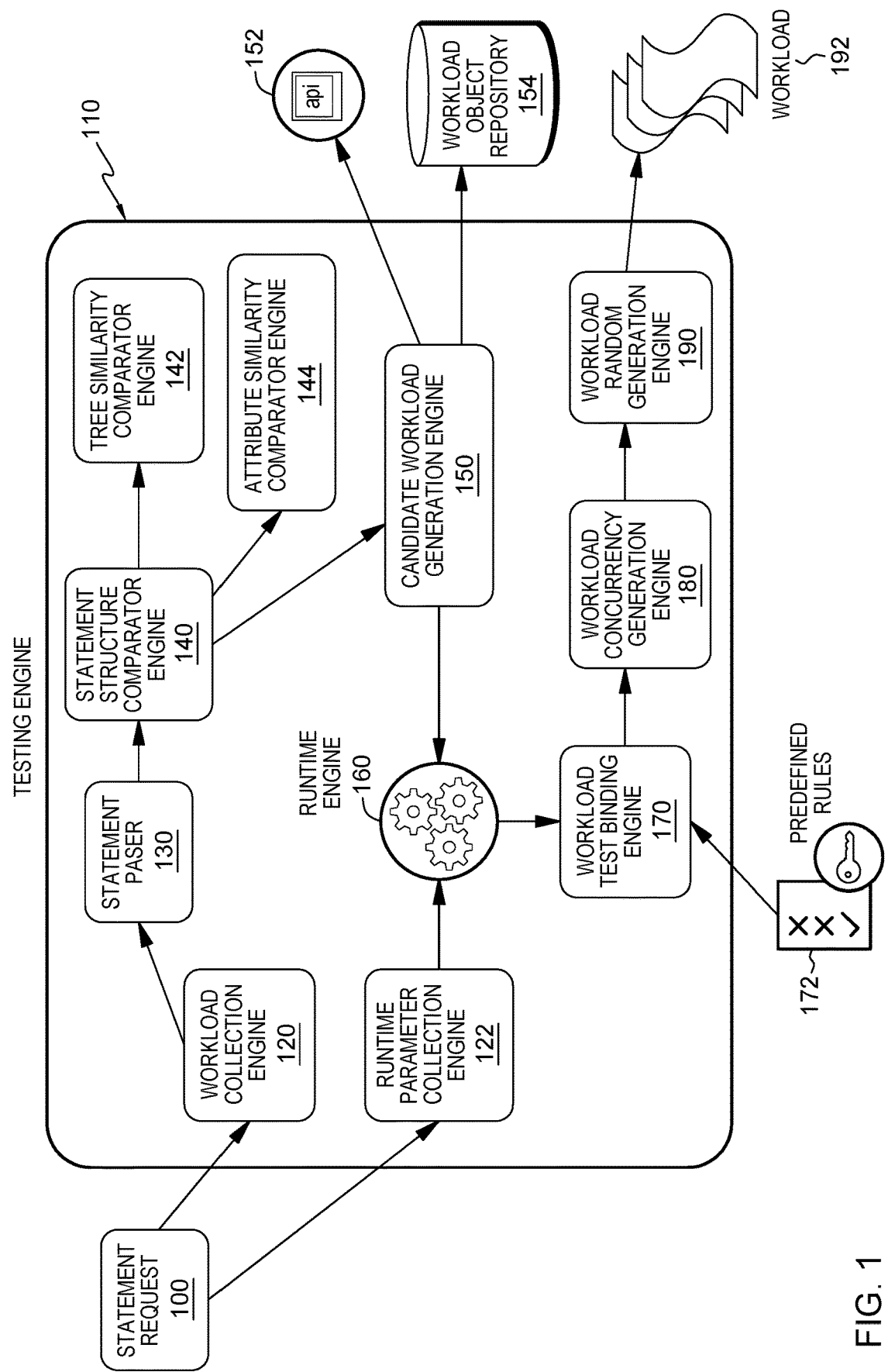
FIG. 1 depicts one example of components used to generate a test workload for systems, such as database systems, in accordance with one or more aspects of the present invention.

In one or more aspects, a capability is provided to facilitate processing within a computing environment. For instance, a capability is provided to generate (e.g., dynamically) effective test workloads for systems, such as database systems. This enables the systems to be appropriately, efficiently and accurately tested, which improves productivity and performance of the systems in a production environment. Improving and/or enhancing such systems improves overall processing within the computing environment.

In accordance with one or more aspects, various engines may be used to generate test workloads for a system, such as a database system. Example engines are described with reference to FIG. 1. A system request 100 is input to a testing engine 110, and more specifically, to a workload collection engine 120 and a runtime parameter collection engine 122 of testing engine 110. Workload collection engine 120 is coupled to a statement parser 130, which is further coupled to a statement structure comparator engine 140, which includes, in one example, a tree similarity comparator engine 142 and an attribute similarity comparator engine 144.

Statement structure comparator engine 140 is further coupled to a candidate workload generation engine 150, which may use one or more application programming interface rules stored in an application programming interface rules repository 152 and/or objects, dependencies and/or attributes from a workload object repository 154 to generate one or more candidate workloads.

Candidate workload generation engine 150 and runtime parameter collection engine 122 are coupled to a runtime engine 160, which provides runtime data that may be used to generate one or more workloads. Runtime engine 160 is coupled to a workload test binding engine 170, which receives as input predefined rules 172, and is used to bind workloads to produce a test workload 192 to be used to test a system. Workload test binding engine 170 may further be coupled to workload concurrency generation engine 180 and/or workload random generation engine 190 to further refine a generated test workload 192.

Although various engines and/or components are depicted in FIG. 1 and used herein to generate a test workload, additional, fewer and/or other engines and/or components may be used.

In one example, testing engine 110 (or one or more engines/components of the testing engine) may be included in a computing environment used to generate (e.g., dynamically) test workloads to test a system, such as a database system. One example of such a computing environment is described with reference to FIG. 2.

Figure 2:
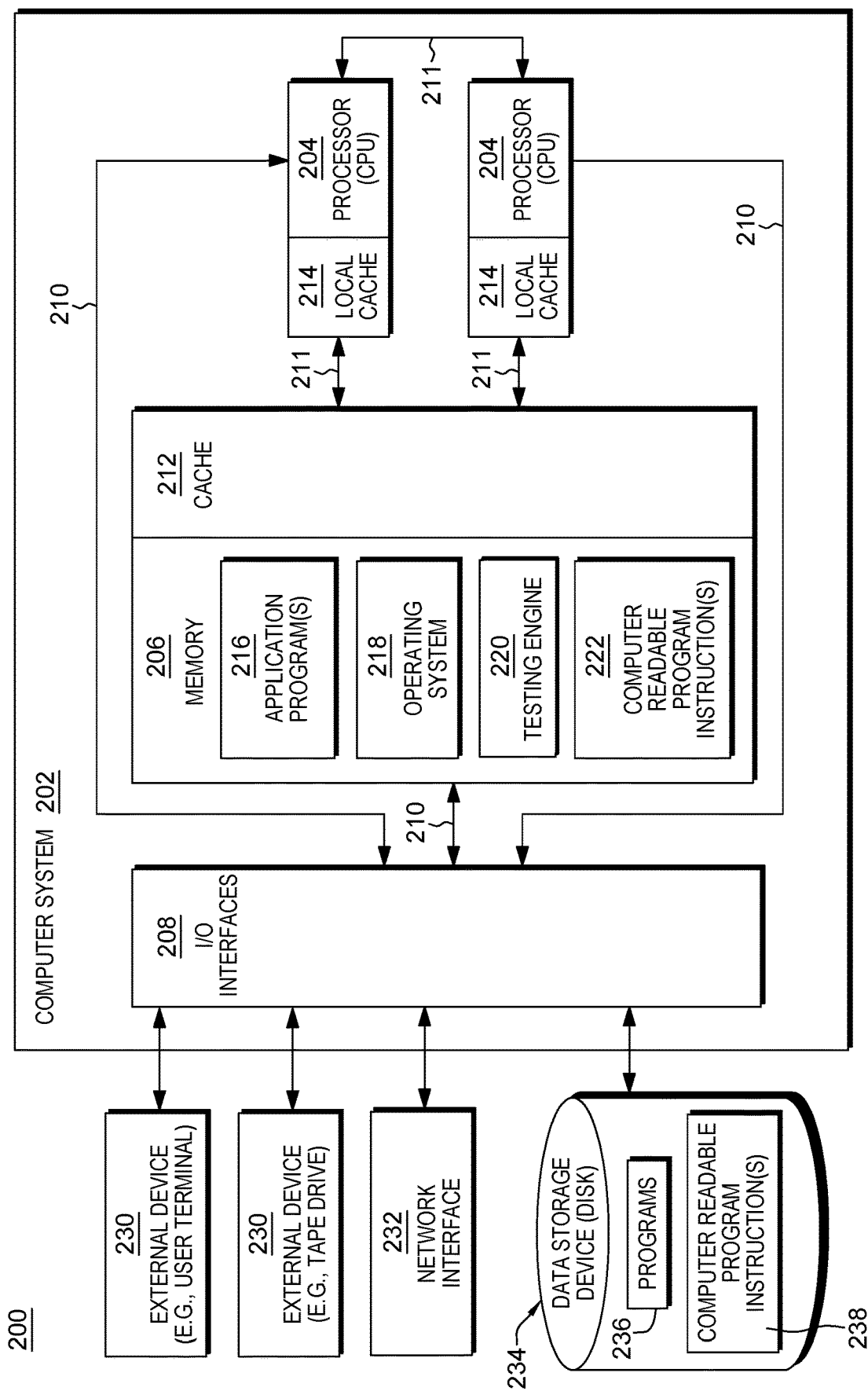
FIG. 2 depicts one example of a computing environment to include and/or use one or more aspects of the present invention.

Referring to FIG. 2, in one example, a computing environment 200 includes, for instance, a computer system 202 shown, e.g., in the form of a general-purpose computing device. Computer system 202 may include, but is not limited to, one or more processors or processing units 204 (e.g., central processing units (CPUs) and/or special-purpose processors, etc.), a memory 206 (a.k.a., system memory, main memory, main storage, central storage or storage, as examples), and one or more input/output (I/O) interfaces 208, coupled to one another via one or more buses and/or other connections. For instance, processors 204 and memory 206 are coupled to I/O interfaces 208 via one or more buses 210, and processors 204 are coupled to one another via one or more buses 211.

Bus 211 is, for instance, a memory or cache coherence bus, and bus 210 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 206 may include, for instance, a cache 212, such as a shared cache, which may be coupled to local caches 214 of one or more processors 204 via, e.g., one or more buses 211. Further, memory 206 may include one or more programs or applications 216, at least one operating system 218, a testing engine 220 (e.g., testing engine 110) and one or more computer readable program instructions 222. Computer readable program instructions 222 may be configured to carry out functions of embodiments of aspects of the invention.

Computer system 202 may communicate via, e.g., I/O interfaces 208 with one or more external devices 230, such as a user terminal, a tape drive, a pointing device, a display, and one or more data storage devices 234, etc. A data storage device 234 may store one or more programs 236, one or more computer readable program instructions 238, and/or data, etc. The computer readable program instructions may be configured to carry out functions of embodiments of aspects of the invention.

Computer system 202 may also communicate via, e.g., I/O interfaces 208 with network interface 232, which enables computer system 202 to communicate with one or more networks, such as a local area network (LAN), a general wide area network (WAN), and/or a public network (e.g., the Internet), providing communication with other computing devices or systems.

Computer system 202 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 202. Examples, include, but are not limited to: microcode, device drivers, redundant processing units, external disk drive arrays, RAID systems, tape drives, and data archival storage systems, etc.

Computer system 202 may be operational with numerous other general-purpose or special purpose computing system environments or configurations. Examples of well-known computing systems, environments, and/or configurations that may be suitable for use with computer system 202 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing.

In one example, testing engine 220 (e.g., testing engine 110) is executed by one or more processors 104. However, in other embodiments, one or more engines and/or components of the testing engine may be hardware devices and/or are maintained, be part of and/or executed by other system resources. Many examples are possible.

One example of a process to generate a test workload (e.g., dynamically) to verify a system, e.g., a database system, executing within a computing environment, such as an environment similar to computing environment 200 and/or other environments, is described with reference to FIG. 3.

Figure 3:
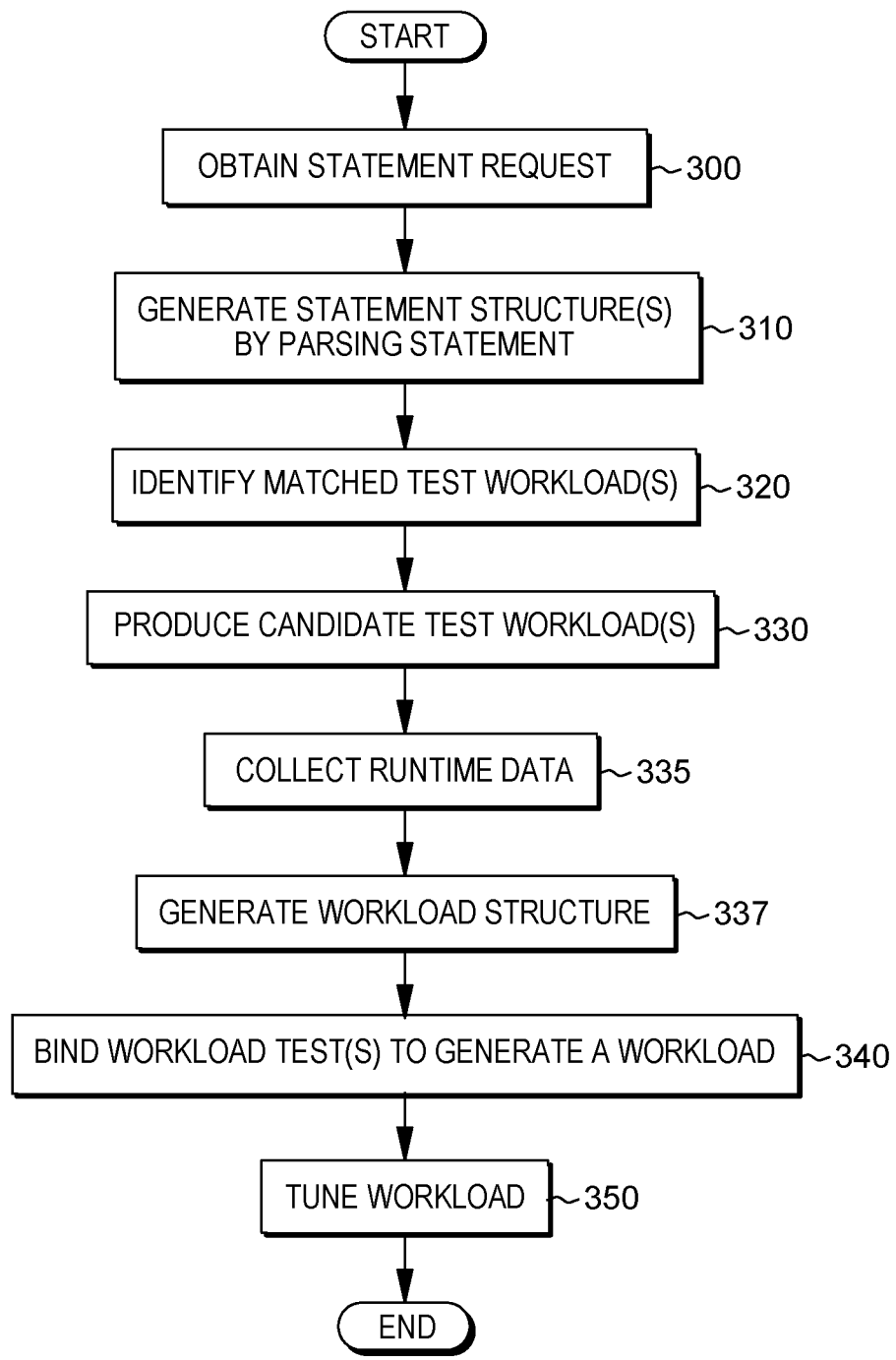
FIG. 3 depicts one example of a process to generate a test workload for a system, such as a database system, in accordance with one or more aspects of the present invention.

Referring to FIG. 3 and FIG. 1, a statement request (e.g., statement request 100) requesting that a test workload be generated is obtained 300 by a testing engine (e.g., testing engine 110). For instance, it is received by one or more collectors (e.g., workload collection engine 120 and runtime parameter collection engine 122). Based on obtaining the statement request, the statement request is parsed 310, e.g., by a statement parser (e.g., statement parser 130) to generate one or more statement structures. Further, in one example, the generated statement structures are compared to one or more existing workload structures via, e.g., a statement structure comparator (e.g., statement structure comparator engine 140) to identify 320 one or more test workloads as matching (e.g., approximately matching) one or more generated statement structures. One or more candidate test workloads are generated 330 via, e.g., a candidate workload generator (e.g., candidate workload generation engine 150) based on one or more identified matched objects, dependencies and/or attributes (of one or more workloads identified as matching—also referred to as matched workloads) of a workload object repository (e.g., workload object repository 154) and/or using one or more application programming interface rules stored in a rules repository, such as application programming interface repository 152. As an example, one or more new statements are generated based on one or more application programming interface rules and object dependency.

Additionally, in one example, runtime data is collected 335 by, e.g., a runtime engine (e.g., runtime engine 160) using a runtime parameter collector (e.g., runtime parameter collection engine 122) and that data is used in generating test workloads. For instance, using the collected runtime data a workload structure is generated 337 that includes select runtime data and statement structures including structures representing the one or more new statements. Further, in one example, based on the workload structure with the runtime data and based on predefined rules 172, workloads (e.g., from the request, candidate workloads, etc.) are bound 340 to one another via, e.g., a binding engine (e.g., workload test binding engine 170) to generate one or more test workloads 192.

Moreover, in one example, one or more of the workloads are optionally tuned 350 via one or more engines, such as a workload concurrency generation engine 180 and a workload random generation engine 190 to produce the one or more test workloads to verify a system, such as a database system. Various of the above processes/operations to generate a workload are described in further detail below.

Figure 4A:
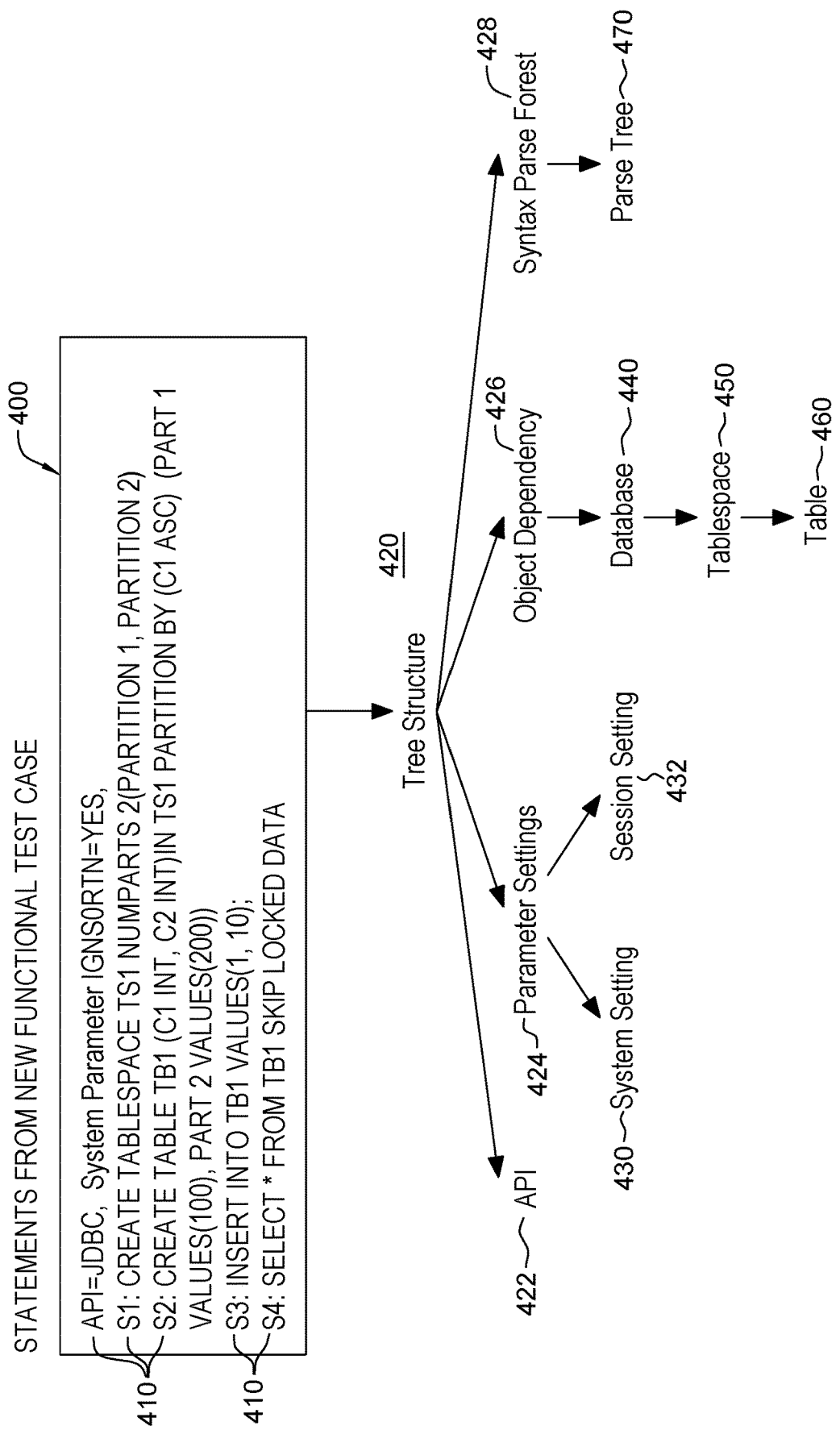
FIGS. 4A-4C depict examples of tree structures used in one or more aspects of the present invention.

As previously indicated, a statement request is obtained (e.g., collected) by a workload collector (e.g., workload collection engine 120). In one example, the statement request is collected from a production (or test or hybrid production/test) database system and/or from a set of existing tests. Based on obtaining the statement request indicating a request to generate a workload to test a system, one or more statement structures are generated. As an example, referring to FIG. 4A, the statement request includes, for instance, a portion of a functional test case 400 to be used to test a system, such as a database system. One or more statements 410 from functional test case 400 are input to, e.g., a statement parser (e.g., statement parser 130), which produces a tree structure 420. As examples, the statement parser may be implemented as part of a database system, a compiler, or other system resource. Further, the statement request may include statements from other test cases and/or may include additional, fewer and/or other statements.

A tree structure includes, for instance, one or more of a database object dependency tree, a syntax parse forest, one or more attributes with application programming interface prerequisite system settings, relevant functions and/or database sub-components. As one particular example, tree structure 420 includes a plurality of branches having branch nodes representing particular statements of the functional test case. Example branch nodes include an application programming interface node 422 representing, e.g., an API statement in functional test case 400; a parameter settings node 424 representing, e.g., a System parameter of functional test case 400; an object dependency node 426 representing various object dependencies in functional test case 400; and a syntax parse forest node 428 including a parse tree 470 representing objects, attributes and their dependencies of functional test case 400.

In one example, parameter settings node 424 has other branch nodes including, e.g., a system setting node 430 and session setting node 432. Similarly, object dependency node 426 includes a database branch node 440, which has a branch node of tablespace 450 emanating therefrom, and similarly, tablespace branch node 450 has a branch node of table 460.

Figure 4B:
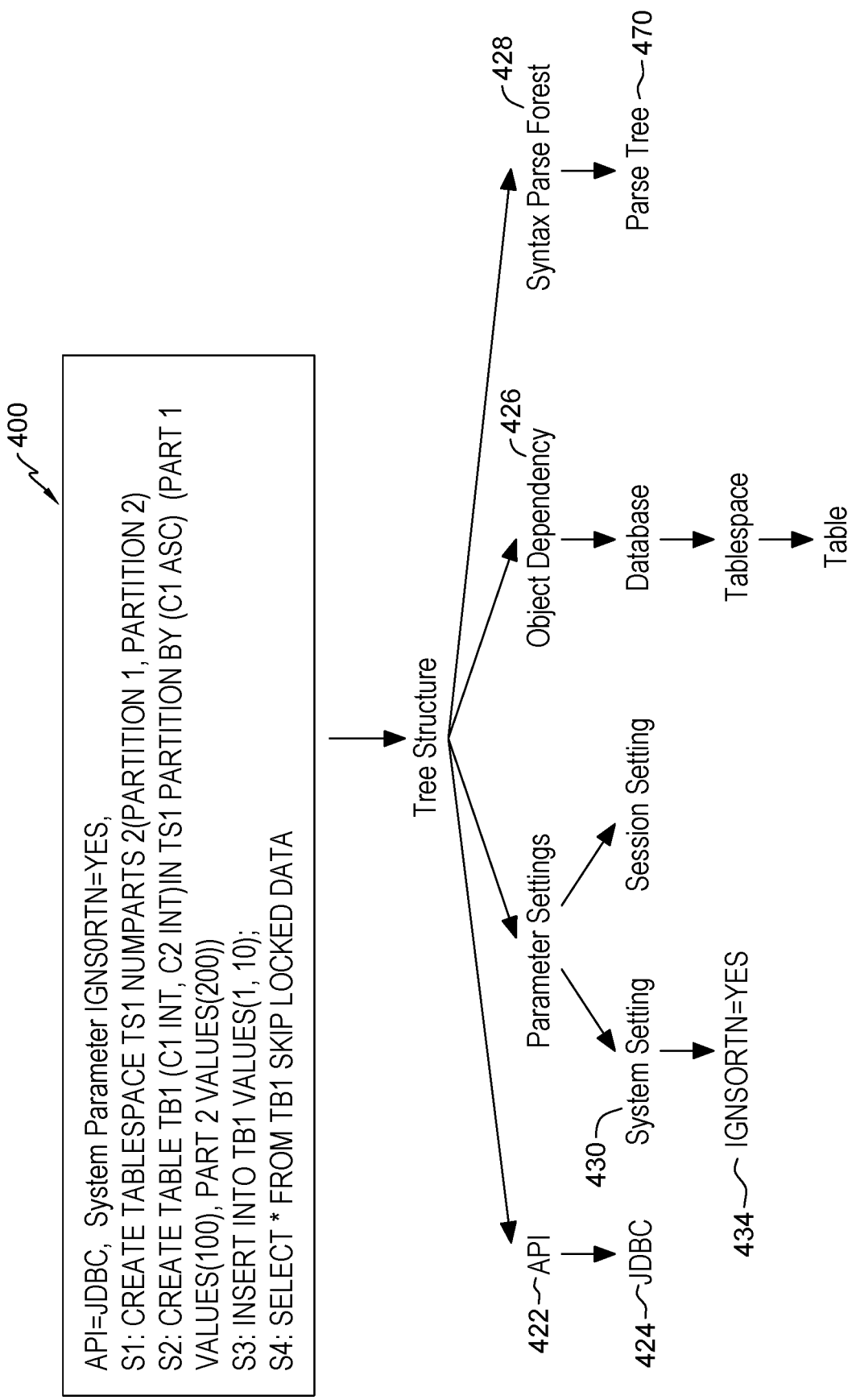

In a further example, referring to FIG. 4B, one or more branch nodes have branches that terminate in leaf nodes, such as branch node 422 has a leaf node JDBC 424 representing JDBC of function test case 400, and system setting branch node 430 has a leaf node IGNSORTN=YES 434 representing the System parameter in functional test case 400. Additional, fewer and/or other branch nodes and/or leaf nodes may be included in the example tree structures described herein based on parsing the statements in the given test case.

Figure 4C:
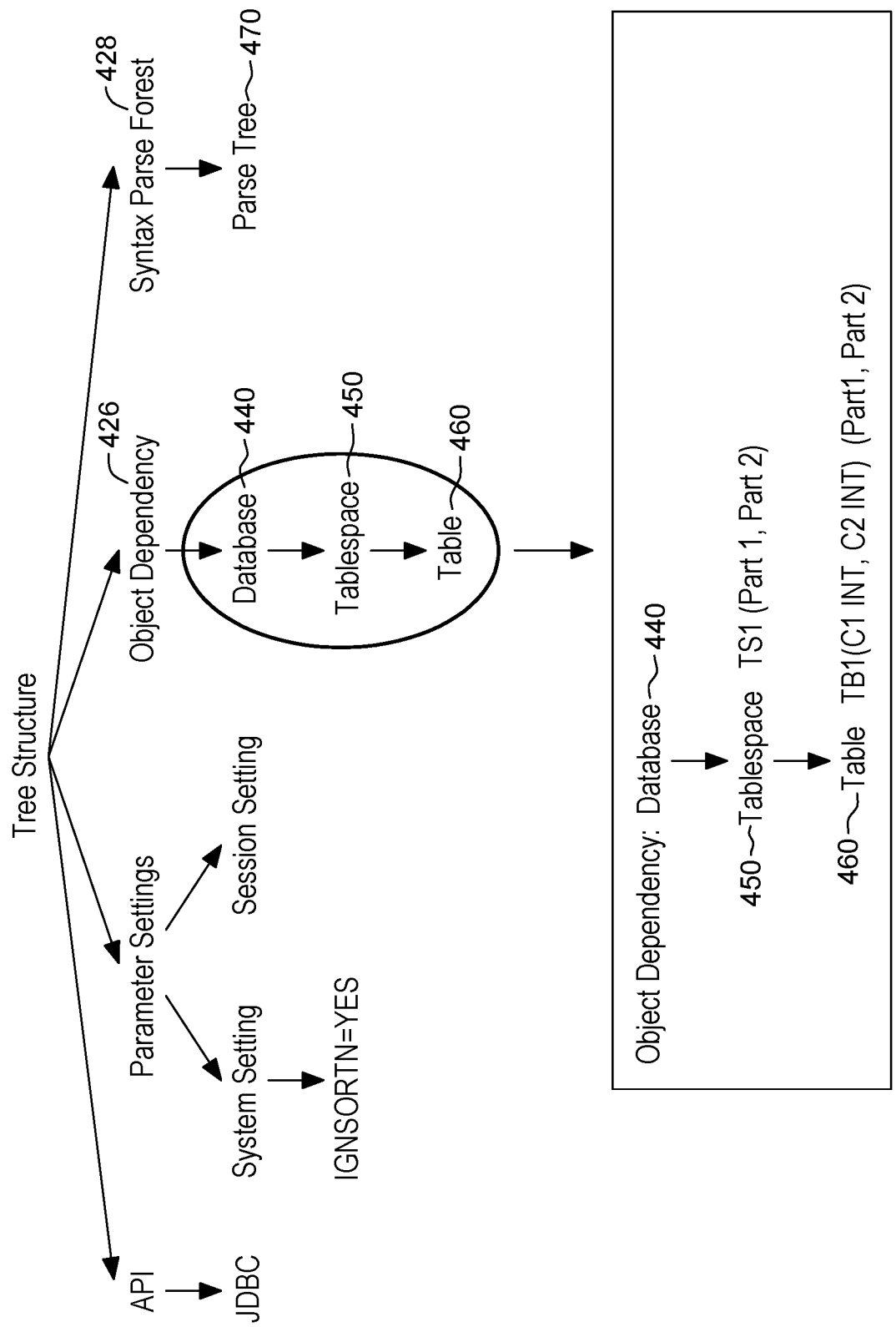

Further details of object dependency branch node 426 and its associated sub-tree structure are described with reference to FIG. 4C. In this example, table 460 has a dependency on tablespace 450, which has a dependency on database 440. For instance, a tablespace TS1 is created, and its attributes include, e.g., Partition 1, Partition 2. Within tablespace TS1, a table TB1 is created that has a plurality of columns C1, C2, which have attributes of an integer, as an example.

Figure 4D:
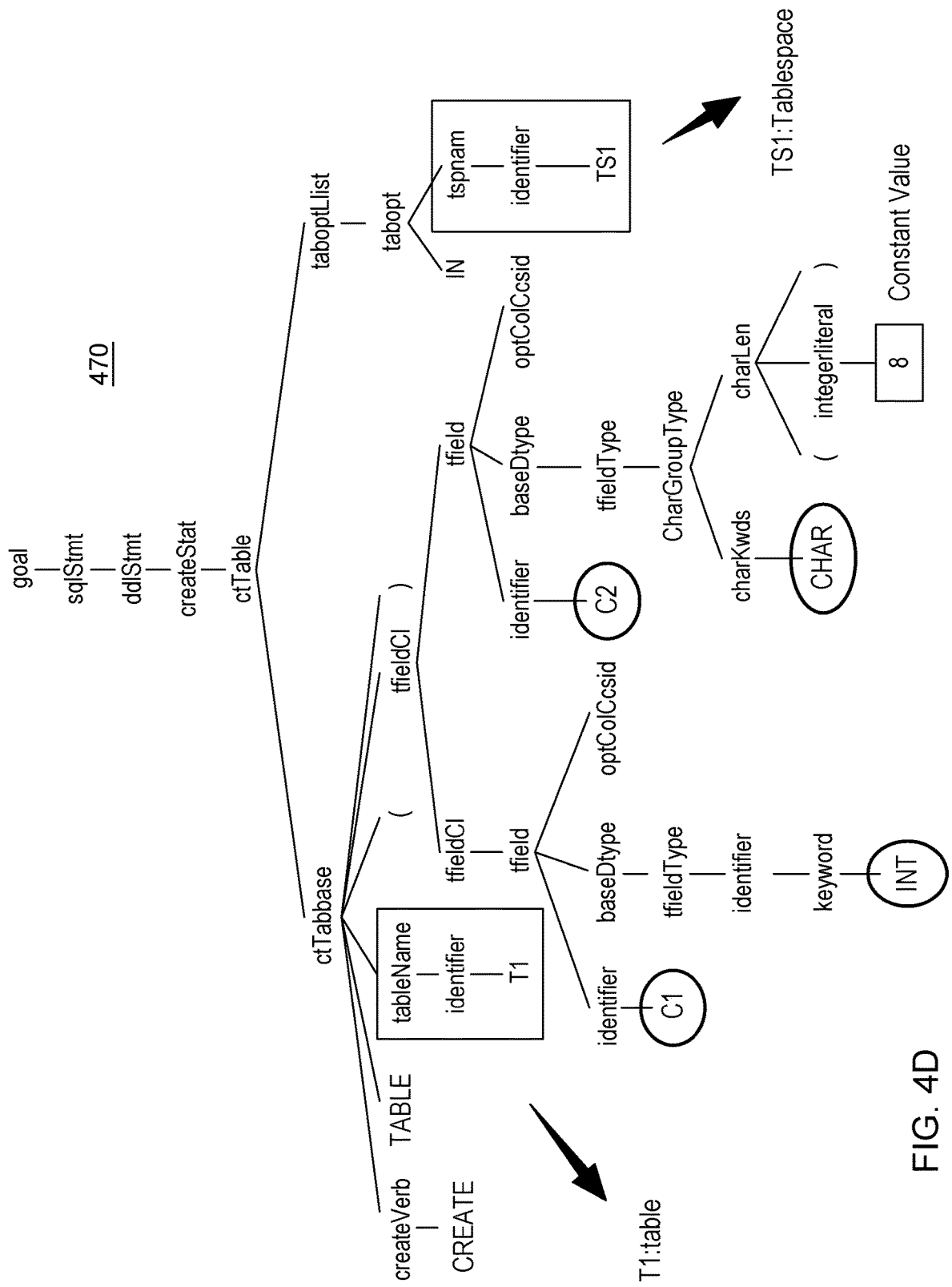
FIG. 4D depicts one example of a parse tree, in accordance with one or more aspects of the present invention.

Further, in one example, syntax parse forest 428 includes a parse tree 470, an example of which is depicted in FIG. 4D. Parse tree 470 is constructed, e.g., from lexical and syntax analysis in which objects and attributes of functional test case 400 are identified. As examples, the lexical and syntax analysis may be performed by a component or engine of a database system and/or other tools, systems and/or components.

Based on generating the statement structures relating to functional test case 400 identified from the statement request, a comparison is performed of the generated structures to one or more workload structures of workloads stored in a repository, such as workload object repository 154. As examples, the workloads are stored in the repository and the workload structures are generated by a parser (e.g., parser 130) and/or the workloads and associated workload structures are stored in the repository. Various examples are possible.

Figures 5A, 5B:
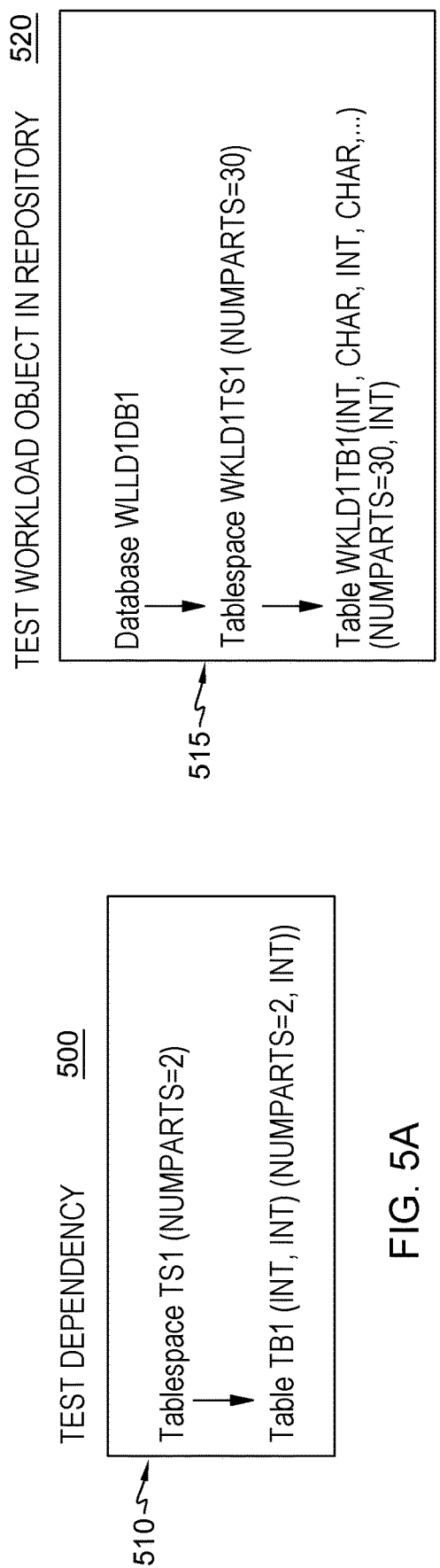
FIGS. 5A-5B depict one example of structures to be compared, in accordance with one or more aspects of the present invention.

In one example, a statement structure comparator (e.g., statement structure comparator engine 140) including a tree similarity comparator (e.g., tree similarity comparator engine 142) and/or an attribute similarity comparator (e.g., attribute similarity comparator engine 144) are used to compare and potentially match one or more generated statement structures of the statement request to one or more test workload structures of existing workloads. One example of such a comparison/matching is depicted in FIGS. 5A-5B. As shown, in one example, functional test case generated structures 500 includes a generated statement structure 510, which is compared to a statement structure 515 of test workload structures 520 obtained from a repository (e.g., workload object repository 154). In one example, the comparing is performed using an approximate match comparison operation (also referred to as a fuzzy match operation or technique) which compares the structures based on certain predefined rules. As examples, the match may be based on tree structure similarity (e.g., using tree similarity comparator engine 142) and/or attribute similarity (e.g., using attribute similarity comparator engine 144) and on different levels, such as order, data type, attribute values, etc. Based on the comparisons, matches are identified. For instance, based on the structures, the type of similarity comparison and the matching levels, the comparison may identify the Table statement in functional test generated statement structure 510 as a match to the Table statement in test workload statement structure 515 (e.g., attribute INT is same in both table statements). Other matches may also be defined, examples of which are described with reference to FIG. 5C.

Figure 5C:
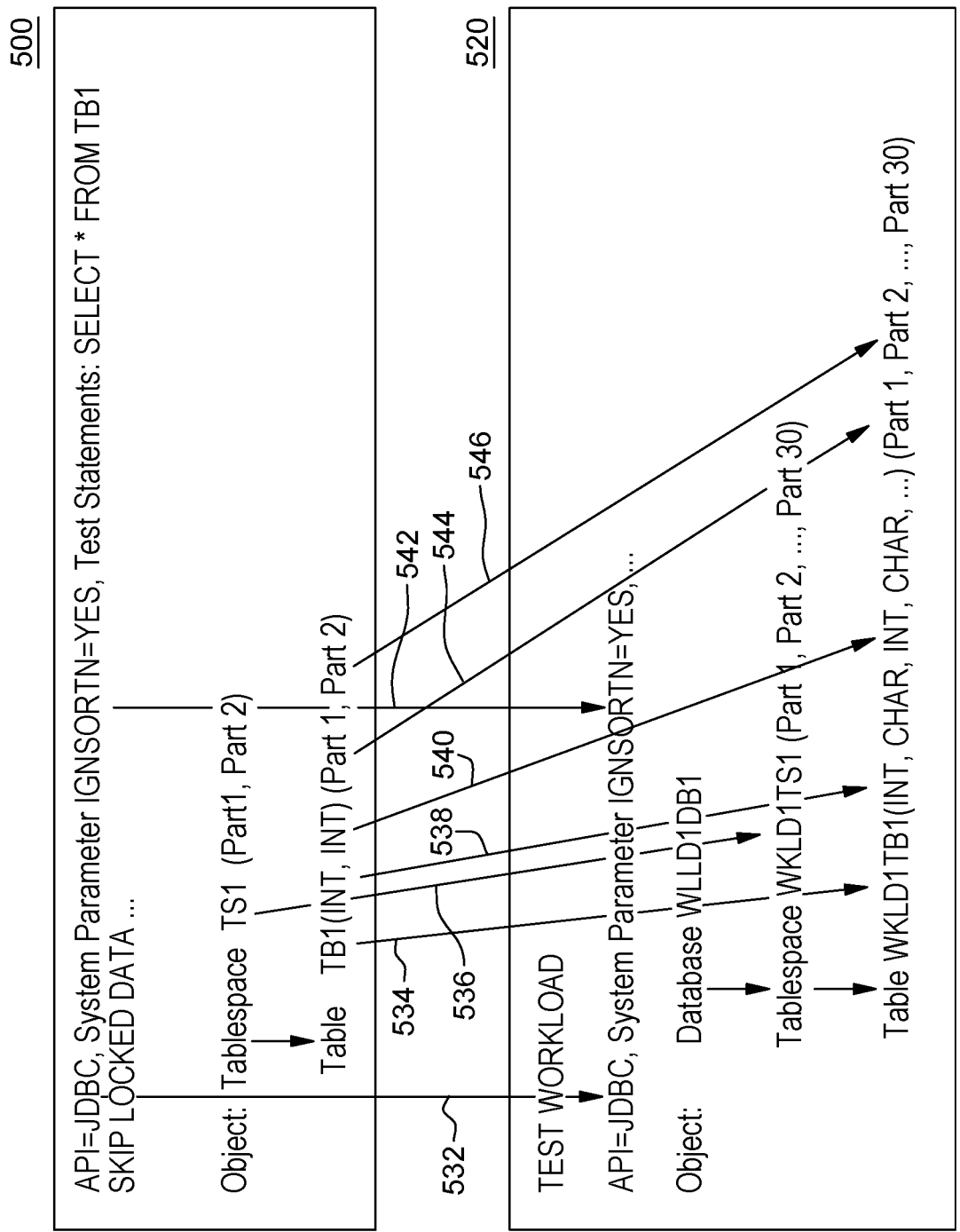
FIG. 5C depicts one example of identifying a matched test workload, in accordance with one or more aspects of the present invention.

In FIG. 5C, both functional test generated statement structures 500 and test workload statement structures 520 include additional statement structures (in other examples, one or more may include additional, fewer and/or other structures). The comparison (e.g., fuzzy matching) identifies, for instance, an API statement structure in structures 500 as a match 532 to an API statement structure in test workload structures 520; a TB1 object in structure 500 as a match 534 to a TB1 object in structure 520; a TS1 object in structure 500 as a match 536 to a TS1 object in structure 520; parameters INT in structure 500 as a match 538, 540, respectively, to INT in structures 520; a system parameter IGNSORTN in structure 500 as a match 542 to a system parameter IGNSORTN in structure 520; and parameters Part 1, Part 2 in structure 500 as a match 544, 546, respectively, to Part 1, Part 2 in structure 520. Other examples are possible.

Figure 6:
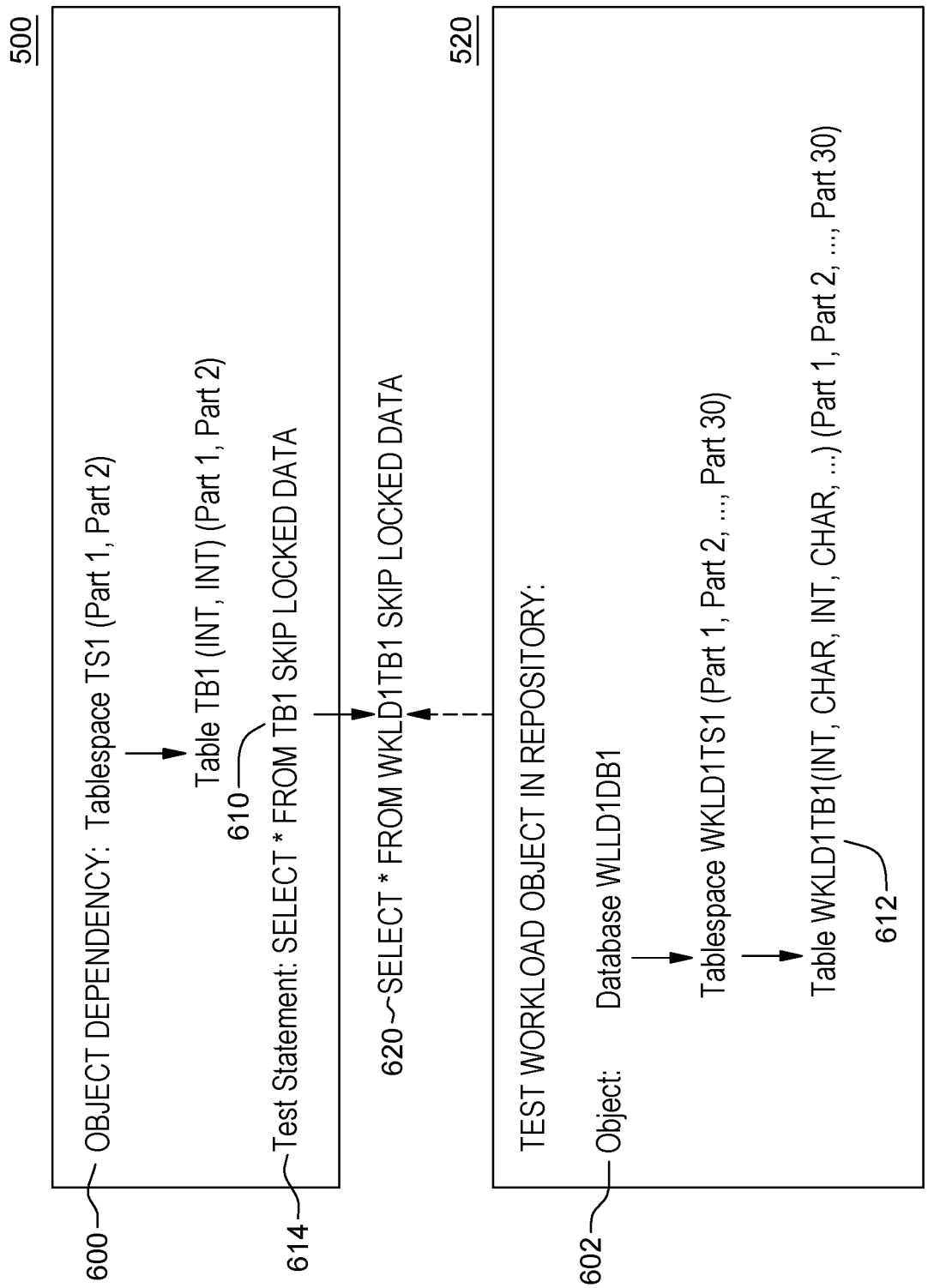
FIG. 6 depicts one example of creating a new test statement for a test workload, in accordance with one or more aspects of the present invention.

The matched test workload structures identify one or more workloads associated with those structures in the repository that have a match (e.g., fuzzy match) to the statement request. Therefore, those matched structures/workloads are used to generate, at least one candidate test workload, as described herein. For instance, at least one candidate test workload is produced by applying one or more application programming interface rules and generating one or more new statements with parse tree adjustments according to, for instance, object dependency. For instance, as shown in FIG. 6, a comparison of object dependency 600 of functional test case structures 500 with an object structure 602 of test workload structures 520 identifies a fuzzy match, and therefore, in accordance with an aspect of the present invention, object TB1 610 in functional test case structure 500 is replaced with the table name WKLD1TB1 612 of test workload structures 520 in one or more statements 620. Thus, statement 620 is part of a candidate test workload being generated. For instance, the candidate test workload starts with a functional test case (e.g., functional test case 400) and replaces one or more of the statements. As a particular example, test statement 614 (or statement S4 is functional test case 400 (FIG. 4A)) is replaced with the new select statement 620.

The above processing is performed for one or more of the objects and/or attributes from the functional test case that match corresponding objects and/or attributes of one or more workloads based on approximate or fuzzy matching that uses one or more predefined rules. The output is one or more candidate test workloads.

Additionally, in one or more aspects, runtime data is collected. This data includes system catalog object status, runtime settings, database subcomponents that are called, and/or object runtime definition with data definition language statements. Additional, less and/or other runtime data may be collected and/or used herein. The data may show, for instance, one more requested alterations.

For instance, one or more attributes of one or more objects may be altered, and current data definition language statements (i.e., at runtime) reflect the change.

As an example, given the following objects:
 Object: Tablespace TS1 (Part 1, Part 2)
  Table TB1(INT, INT) (Part 1, Part 2)
Object Tablespace is altered by indicating segment size, and Table is altered by adding a character attribute, as follows, in one example:
 Object: Tablespace TS1 (Part 1, Part 2) SEGSIZE 64
  Table TB1(INT, INT, CHAR(8)) (Part 1, Part 2)
 Based on the foregoing, the following data definition language statements are produced:

DDLs:
 Create Tablespace TS1 Numparts 2(Partition 1, Partition 2) SEGSIZE 64
 Create Table TB1 (C1 INT, C2 INT, CHAR(8)) IN TS1 Partition By (C1 ASC) (Part 1 Values (100), Part 2 (200)).

Figure 7:
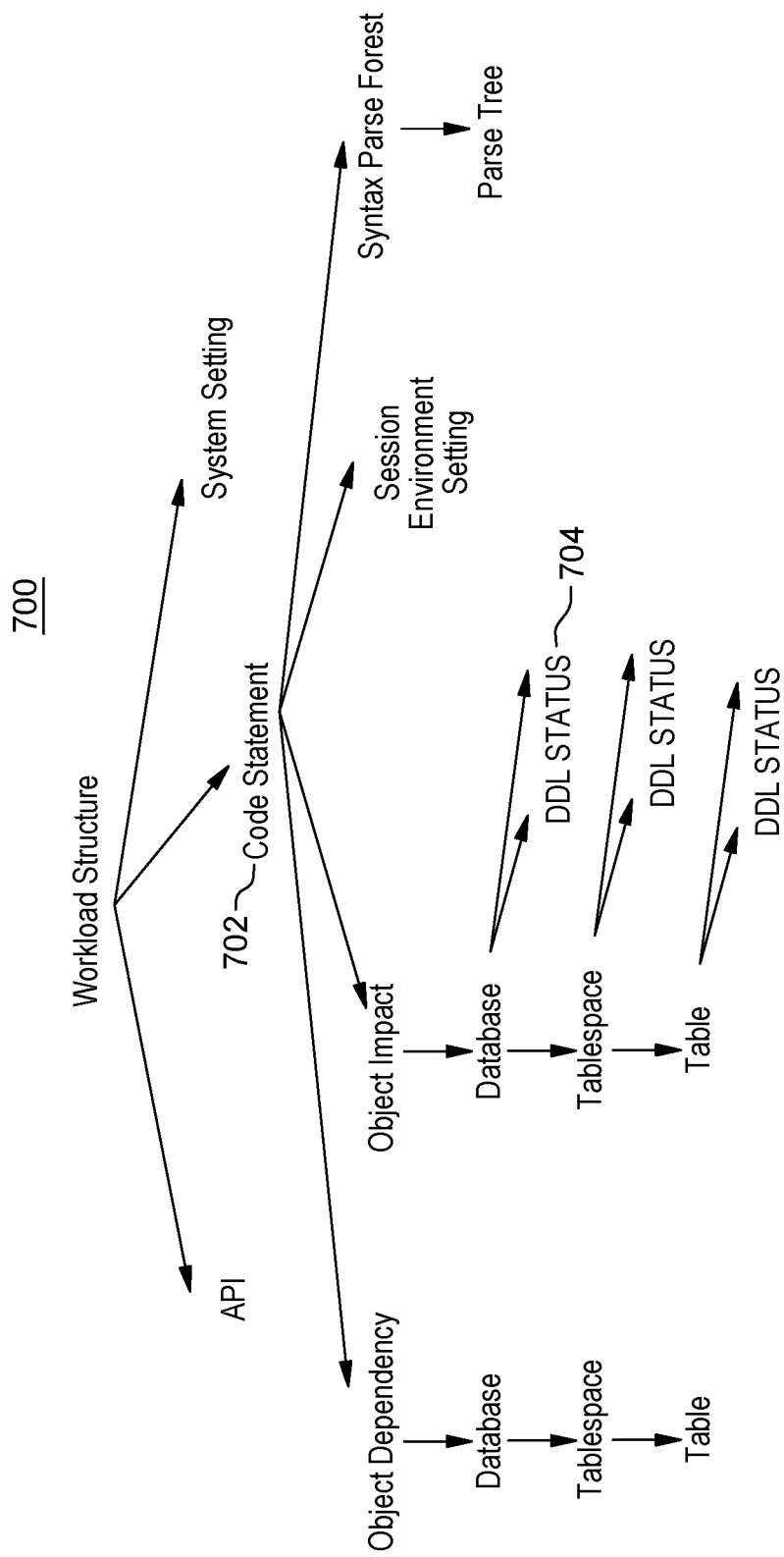
FIG. 7 depicts one example of a test workload structure generated in accordance with one or more aspects of the present invention.

Using the runtime data, a workload structure with runtime data combined with statement structures is generated, an example of which is depicted in FIG. 7. As shown, a workload structure 700 is generated that includes statement structures 702 and runtime data 704 (e.g., Data Definition Language status).

Figure 8:
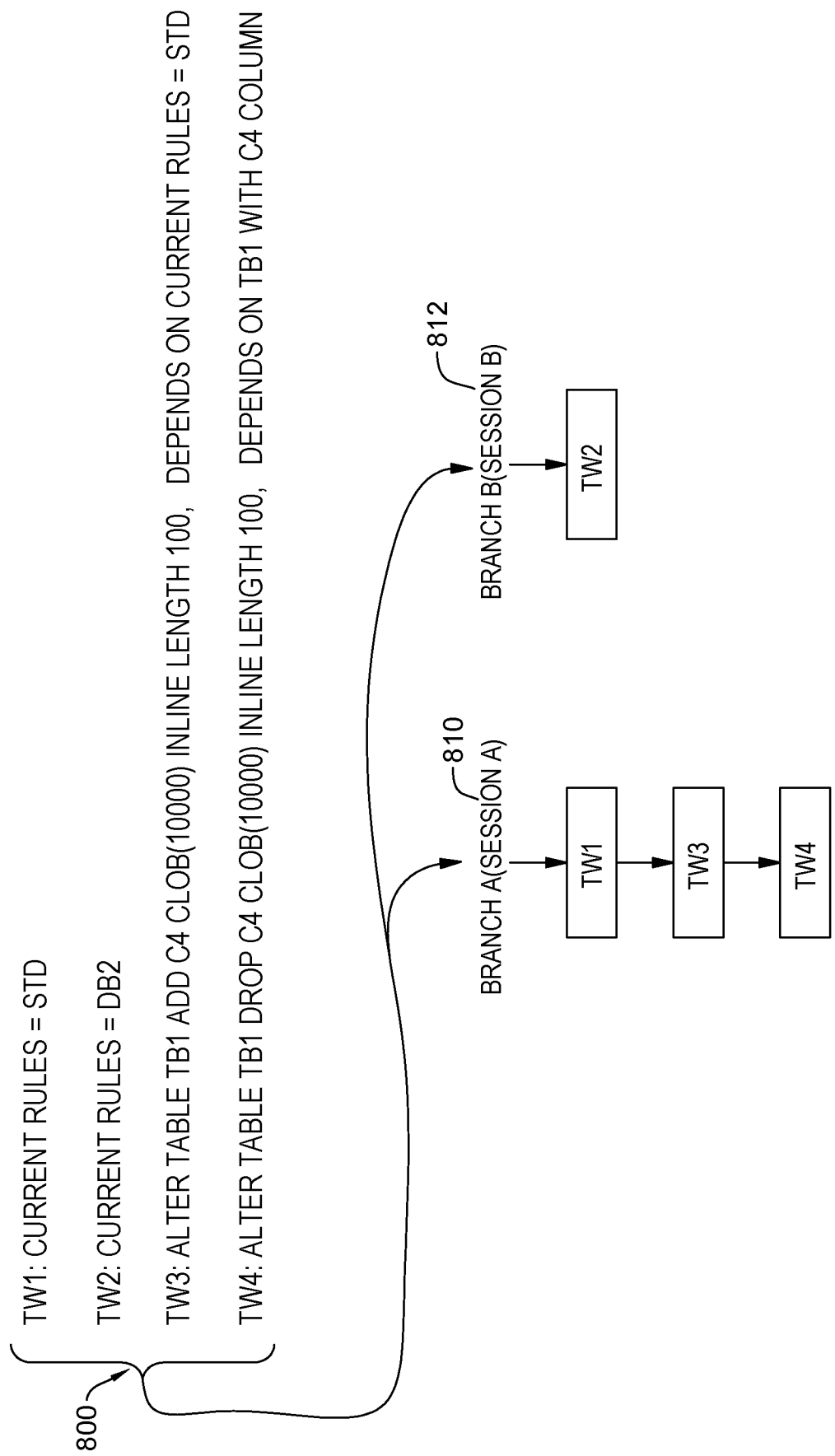
FIG. 8 depicts one example of binding of workloads, in accordance with one or more aspects of the present invention.

In one example, based on the workload structure (e.g., workload structure 700) and predefined rules (e.g., predefined rules 172), a plurality of workloads generated based on the workload structure are bound together to create a test workload (e.g., workload 192). For instance, as shown in FIG. 8, there are four workloads 800 that have been generated and based on rules and/or runtime data, it is determined that workload TW4 is dependent on workload TW3, which is dependent on workload TW1. Workloads TW4, TW3 and TW1 are part of one branch 810 and workload TW2 is part of another branch 812 and the workloads of both branches are bound to one another to create a test workload (e.g., workload 192). The test workload may include additional, fewer and/or other workloads based on the above processing. Many examples are possible.

The test workload may be tuned, in one or more aspects. For instance, parameters of the workload may be changed to run one or more threads of the workload concurrently or to randomly select a thread or one or more statements of the workload to be executed. The tuning may be based on user input and/or other input.

Described herein is a capability to dynamically generate a test workload to verify a system, such as a database system. The workload is generated based on, for instance, characteristics of the system and/or runtime conditions. In one or more aspects, the test workload is generated based on a functional test set and existing test workloads in a test repository. Candidate workloads are generated by applying application programming interface rules and generating new statements with parse tree adjustments according to object dependency. Workload tests are bound with selected and candidate workloads according to the workload structure with runtime data, along with predefined rules.

One or more aspects of the present invention are inextricably tied to computer technology and facilitate processing within a computer, improving performance thereof. By dynamically creating a test workload to effectively verify a system, such as a database system, processing within a computing environment is improved. By using runtime data in creating the test workload, the workload is able to test/verify the system with more accuracy and more efficiently.

Although embodiments are described herein, other variations and/or embodiments are possible.

Figure 9A:
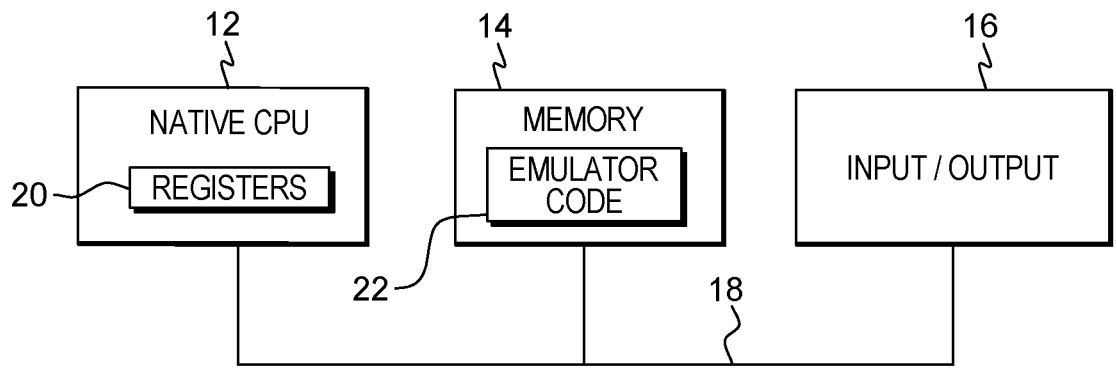
FIG. 9A depicts another example of a computing environment to incorporate and/or use one or more aspects of the present invention.

Another example of a computing environment to incorporate and use one or more aspects of the present invention is described with reference to FIG. 9A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include IBM® Power® processor offered by International Business Machines Corporation, Armonk, N.Y.; an HP Superdome with Intel® processors offered by Hewlett Packard Co., Palo Alto, California; and/or other machines based on architectures offered by International Business Machines Corporation, Hewlett Packard, Intel Corporation, Oracle, or others. Intel is a trademark or registered trademark of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than, e.g., the IBM® z/Architecture® instruction set architecture, such as Power processors, HP Superdome servers or others, to emulate the z/Architecture instruction set architecture and to execute software and instructions developed based on the z/Architecture instruction set architecture. z/Architecture is a trademark or registered trademark of International Business Machines Corporation in at least one jurisdiction.

Figure 9B:
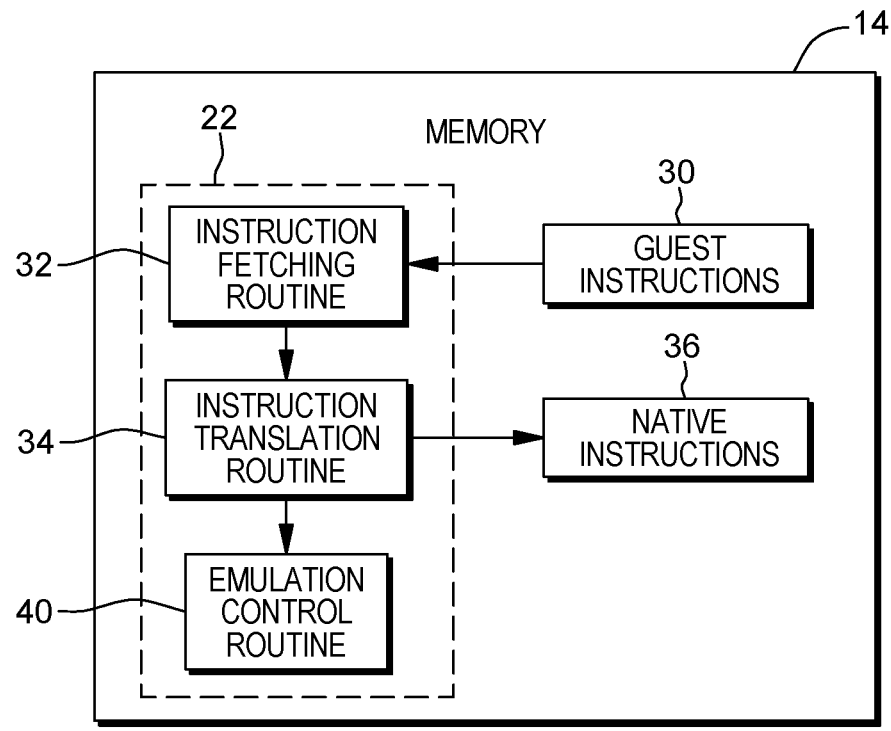
FIG. 9B depicts further details of the memory of FIG. 9A, in accordance with one or more aspects of the present invention.

Further details relating to emulator code 22 are described with reference to FIG. 9B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture instruction set architecture, but instead, are being emulated on native CPU 12, which may be, for example, an Intel processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured to dynamically and automatically generate test workloads, and/or to perform one or more other aspects of the present invention.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
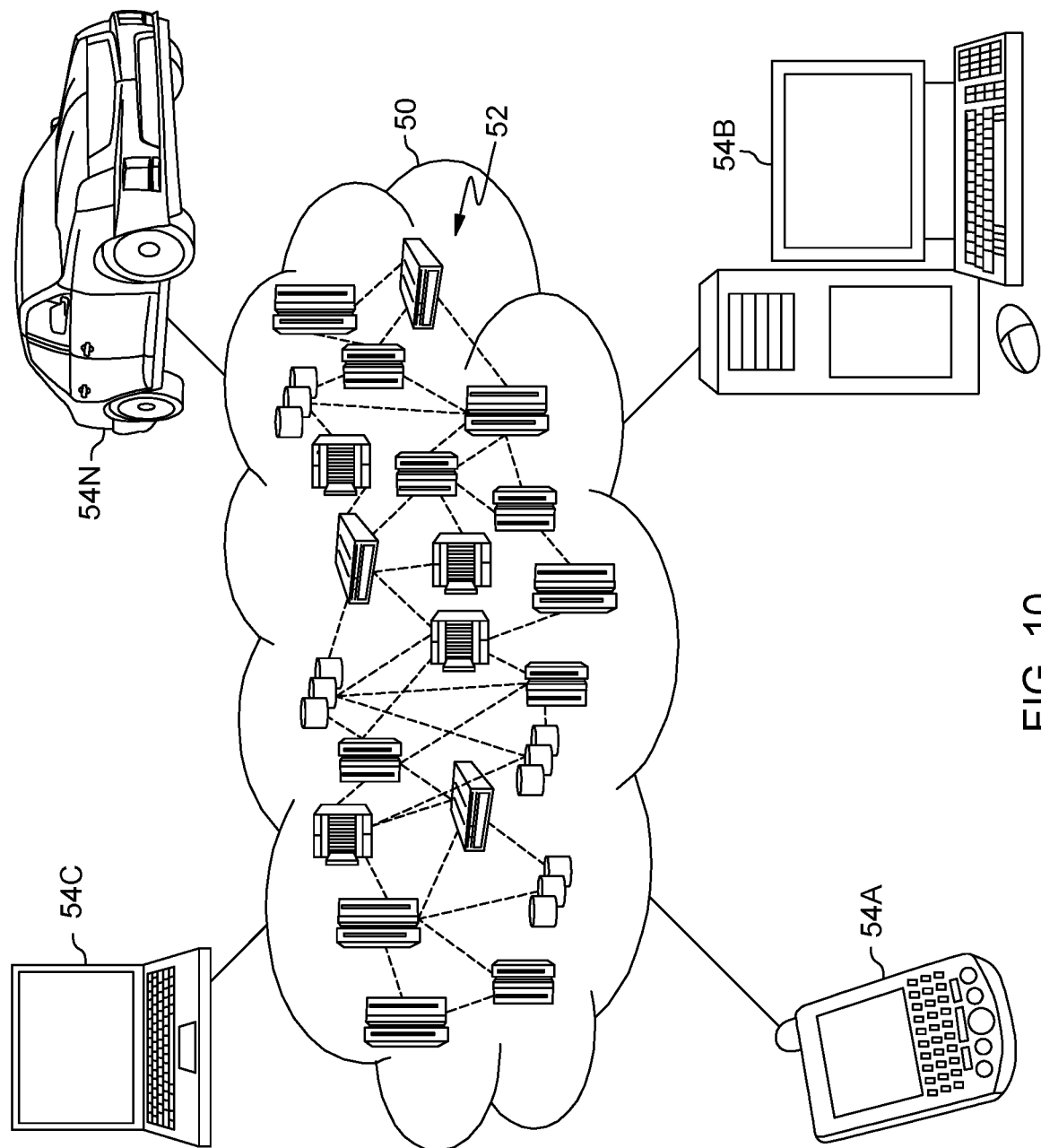
FIG. 10 depicts one embodiment of a cloud computing environment, in accordance with one or more aspects of the present invention.

Referring now to FIG. 10, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 52 and cloud computing environment 50 can communicate with any type of computerized device over any type of network and/or network addressable connection (e.g., using a web browser).

Figure 11:
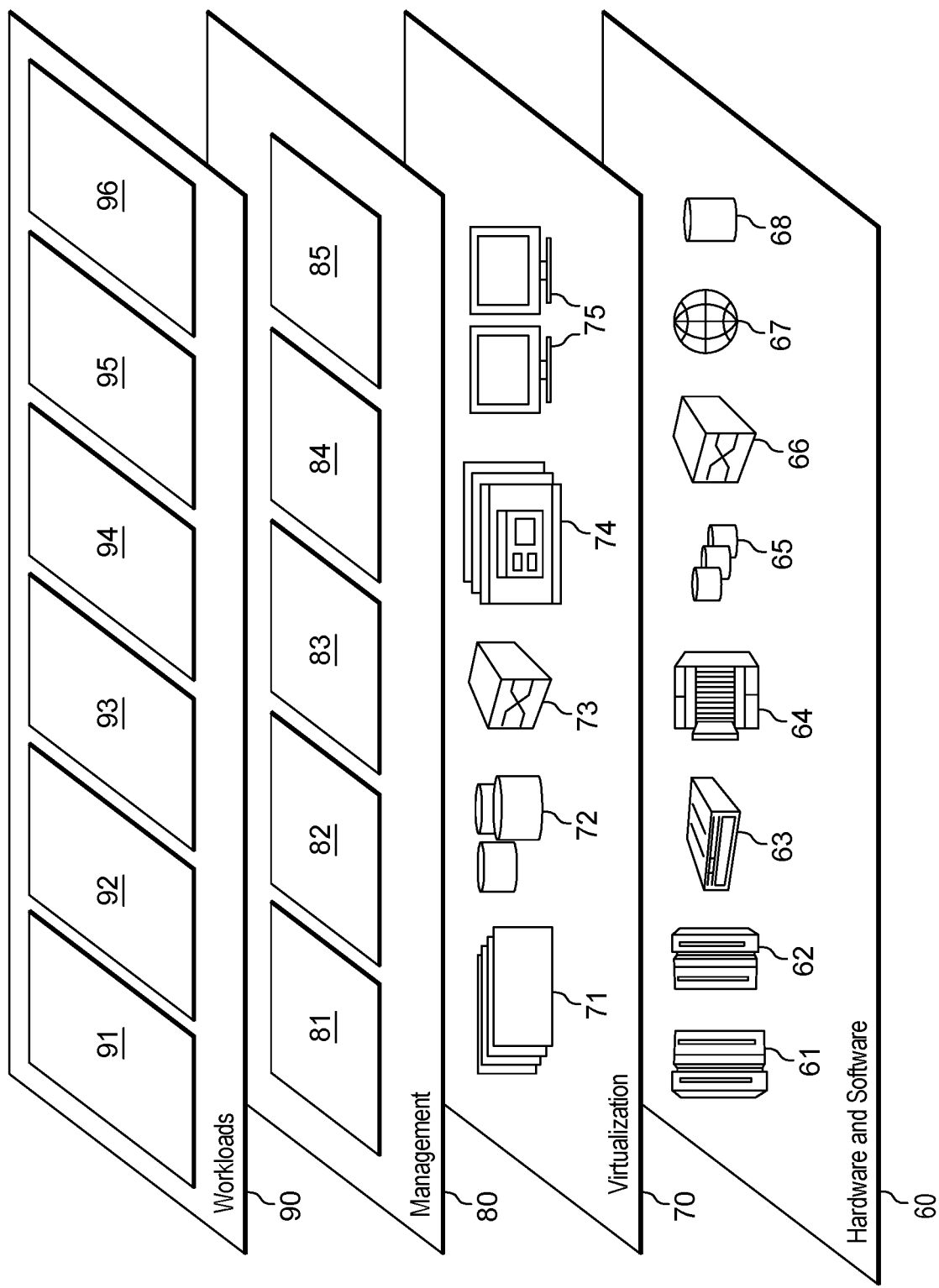
FIG. 11 depicts one example of abstraction model layers, in accordance with one or more aspects of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workload generation processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different types of parsers, analyzers, engines and/or techniques may be employed. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    at least one non-transitory computer readable storage medium and program instructions collectively stored on the at least one computer readable storage medium to perform a method comprising:
    testing a database system of the computing environment, the testing incorporating database system runtime data to enhance accuracy of the testing, the testing comprising:
        dynamically generating, by a testing engine running in the computing environment, a test workload to be executed to test the database system of the computing environment, the test workload being dynamically generated based, at least, on one or more runtime conditions of the database system, the dynamically generating the test workload comprising:
            parsing, by a statement parser of the testing engine, one or more database statements of an input test case to generate one or more parsed structures;
            performing, by a comparator engine of the testing engine, based on generation of the one or more parsed statement structures, a comparison of at least one parsed structure of the one or more parsed structures and at least one test workload structure of at least one existing workload to identify one or more workload structures as matching the at least one parsed structure;
            running the database system and collecting, using a runtime engine of the testing engine, database system runtime data relating to running at least the one or more workload structures identified as matching the at least one parsed structure;
            based on the database system runtime data and one or more new database statements of one or more candidate test workloads, automatically generating at least one combined workload structure comprising one or more statement structures representing the one or more new database statements of the one or more candidate test workloads, and at least a portion of the database system runtime data, the at least a portion of the database system runtime data representing a requested alteration to a statement structure of the one or more statement structures;
            generating a plurality of workloads based, at least, on the at least one combined workload structure with the at least a portion of the database system runtime data;
            generating the test workload based on the plurality of workloads, wherein generating the test workload includes binding, based on the database system runtime data, the plurality of workloads to generate the test workload to be used to test the database system, wherein use of the database system runtime data enhances accuracy of the database system testing; and
        executing the test workload to test the database system.

2. The computer program product of claim 1, wherein the one or more parsed structures include at least one object dependency tree, one or more attributes and a syntax parse forest.

3. The computer program product of claim 1, wherein the performing the comparison comprises performing an approximate match comparison.

4. The computer program product of claim 1, wherein the testing further comprises generating the one or more candidate test workloads, based on the one or more workload structures identified as matching the at least one parsed structure, the one or more candidate workloads comprising the one or more new database statements.

5. The computer program product of claim 4, wherein generating the one or more candidate test workloads is based on one or more object dependencies of the one or more parsed structures and one or more predefined rules.

6. A computer system for facilitating processing within a computing environment, the computer system comprising:
- a memory; and
- at least one processor in communication with the memory, wherein the computer system is configured to perform a method, said method comprising:
  - testing a database system of the computing environment, the testing incorporating database system runtime data to enhance accuracy of the testing, the testing comprising:
    - dynamically generating, by a testing engine running in the computing environment, a test workload to be executed to test the database system of the computing environment, the test workload being dynamically generated based, at least, on one or more runtime conditions of the database system, the dynamically generating the test workload comprising:
      - parsing, by a statement parser of the testing engine, one or more database statements of an input test case to generate one or more parsed structures;
      - performing, by a comparator engine of the testing engine, based on generation of the one or more parsed statement structures, a comparison of at least one parsed structure of the one or more parsed structures and at least one test workload structure of at least one existing workload to identify one or more workload structures as matching the at least one parsed structure;
      - running the database system and collecting, using a runtime engine of the testing engine, database system runtime data relating to running at least the one or more workload structures identified as matching the at least one parsed structure;
      - based on the database system runtime data and one or more new database statements of one or more candidate test workloads, automatically generating at least one combined workload structure comprising one or more statement structures representing the one or more new database statements of the one or more candidate test workloads, and at least a portion of the database system runtime data, the at least a portion of the database system runtime data representing a requested alteration to a statement structure of the one or more statement structures;
      - generating a plurality of workloads based, at least, on the at least one combined workload structure with the at least a portion of the database system runtime data;
      - generating the test workload based on the plurality of workloads, wherein generating the test workload includes binding, based on the database system runtime data, the plurality of workloads to generate the test workload to be used to test the database system, wherein use of the database system runtime data enhances accuracy of the database system testing; and
    - executing the test workload to test the database system.

7. The computer system of claim 6, wherein the one or more parsed structures include at least one object dependency tree, one or more attributes and a syntax parse forest.

8. The computer system of claim 6, wherein the performing the comparison comprises performing an approximate match comparison.

9. The computer system of claim 6, wherein the testing further comprises generating the one or more candidate test workloads, based on the one or more workload structures identified as matching the at least one parsed structure, the one or more candidate workloads comprising the one or more new database statements.

10. The computer system of claim 9, wherein generating the one or more candidate test workloads is based on one or more object dependencies of the one or more parsed structures and one or more predefined rules.

11. A computer-implemented method of facilitating processing within a computing environment, the computer-implemented method comprising:
- testing a database system of the computing environment, the testing incorporating database system runtime data to enhance accuracy of the testing, the testing comprising:
  - dynamically generating, by a testing engine running in the computing environment, a test workload to be executed to test the database system of the computing environment, the test workload being dynamically generated based, at least, on one or more runtime conditions of the database system, the dynamically generating the test workload comprising:
    - parsing, by a statement parser of the testing engine, one or more database statements of an input test case to generate one or more parsed structures;
    - performing, by a comparator engine of the testing engine, based on generation of the one or more parsed statement structures, a comparison of at least one parsed structure of the one or more parsed structures and at least one test workload structure of at least one existing workload to identify one or more workload structures as matching the at least one parsed structure;
    - running the database system and collecting, using a runtime engine of the testing engine, database system runtime data relating to running at least the one or more workload structures identified as matching the at least one parsed structure;
    - based on the database system runtime data and one or more new database statements of one or more candidate test workloads, automatically generating at least one combined workload structure comprising one or more statement structures representing the one or more new database statements of the one or more candidate test workloads, and at least a portion of the database system runtime data, the at least a portion of the database system runtime data representing a requested alteration to a statement structure of the one or more statement structures;

generating a plurality of workloads based, at least, on the at least one combined workload structure with the at least a portion of the database system runtime data;

generating the test workload based on the plurality of workloads, wherein generating the test workload includes binding, based on the database system runtime data, the plurality of workloads to generate the test workload to be used to test the database system, wherein use of the database system runtime data enhances accuracy of the database system testing; and executing the test workload to test the database system.

12. The computer-implemented method of claim 11, wherein the one or more parsed structures include at least one object dependency tree, one or more attributes and a syntax parse forest.

13. The computer-implemented method of claim 11, wherein the performing the comparison comprises performing an approximate match comparison.

14. The computer-implemented method of claim 11, wherein the testing further comprises generating the one or more candidate test workloads, based on the one or more workload structures identified as matching the at least one parsed structure, the one or more candidate workloads comprising the one or more new database statements.

15. The computer-implemented method of claim 14, wherein generating the one or more candidate test workloads is based on one or more object dependencies of the one or more parsed structures and one or more predefined rules.

* * * * *